Nov. 12, 1968          P. R. MOLLISON            3,410,359
       DEVICE FOR ISOLATING AND EARTHING THE ELECTRICAL
              CIRCUIT OF MOTOR VEHICLES IN THE
                    EVENT OF A COLLISION
Filed Aug. 29, 1966                        3 Sheets-Sheet 1

INVENTOR
PAUL RICHARD MOLLISON
By Linton and Linton
ATTORNEYS

Nov. 12, 1968　　　　P. R. MOLLISON　　　　3,410,359
DEVICE FOR ISOLATING AND EARTHING THE ELECTRICAL
CIRCUIT OF MOTOR VEHICLES IN THE
EVENT OF A COLLISION
Filed Aug. 29, 1966　　　　　　　　　　　　3 Sheets-Sheet 2

INVENTOR
PAUL RICHARD MOLLISON
By Linton and Linton
ATTORNEYS

Nov. 12, 1968 P. R. MOLLISON 3,410,359
DEVICE FOR ISOLATING AND EARTHING THE ELECTRICAL
CIRCUIT OF MOTOR VEHICLES IN THE
EVENT OF A COLLISION

Filed Aug. 29, 1966 3 Sheets-Sheet 3

INVENTOR
PAUL RICHARD MOLLISON
By Linton and Linton
ATTORNEYS

United States Patent Office 3,410,359
Patented Nov. 12, 1968

3,410,359
DEVICE FOR ISOLATING AND EARTHING THE ELECTRICAL CIRCUIT OF MOTOR VEHICLES IN THE EVENT OF A COLLISION
Paul Richard Mollison, Corner of Scarborough Beach Road and Loftus St., Mount Hawthorn, Western Australia, Australia
Filed Aug. 29, 1966, Ser. No. 575,781
Claims priority, application Australia, Sept. 3, 1965, 63,632/65
6 Claims. (Cl. 180—103)

ABSTRACT OF THE DISCLOSURE

A device for isolating and grounding the electrical circuit of a motor vehicle in the event of a collision, which device includes a spring loaded trigger arranged to bear against a moving contact when the vehicle is subjected to a collision to force the moving contact away from a first fixed contact to open the electrical circuit of the motor vehicle and to contact a second fixed contact to ground the electrical circuit of the vehicle.

Description

This invention relates to a device for isolating and grounding the electrical circuit of a motor vehicle in the event of a collision.

In its broadest form the invention resides in a device for isolating and grounding the electrical circuit of a motor vehicle in the event of a collision comprising a pair of spaced fixed contacts, one of which is adapted to be connected to one of the terminals of the battery of the motor vehicle and the other of which is adapted to be connected to a ground; a moving contact adapted to be connected to the electrical circuit of the vehicle and biased to a position in contact with said one fixed contact; a spring-loaded trigger adapted to bear against the said moving contact and move it to a position where it is in contact with said other fixed contact; and means for holding said trigger out of engagement with said moving contact, said holding means being such that when the vehicle is subjected to a sudden shock it releases said trigger.

If desired, the device may be provided with means for applying the brakes in the event of a collision. In one such embodiment the coil of a solenoid is connected to the terminal of the battery and to the moving contact, whilst the plunger of the solenoid is connected to the brake pedal of the vehicle. In another embodiment a solenoid is connected to the terminal of the battery, and to the moving contact and to a spigot holding a spring-loaded member connected to the brake pedal in the loaded position so that when the device is actuated the solenoid moves the spigot to the disengaged position so that the spring-loaded member actuates the brake.

The invention will be better understood by reference to the following description of one embodiment illustrated in the drawings in which.

Figure 1:
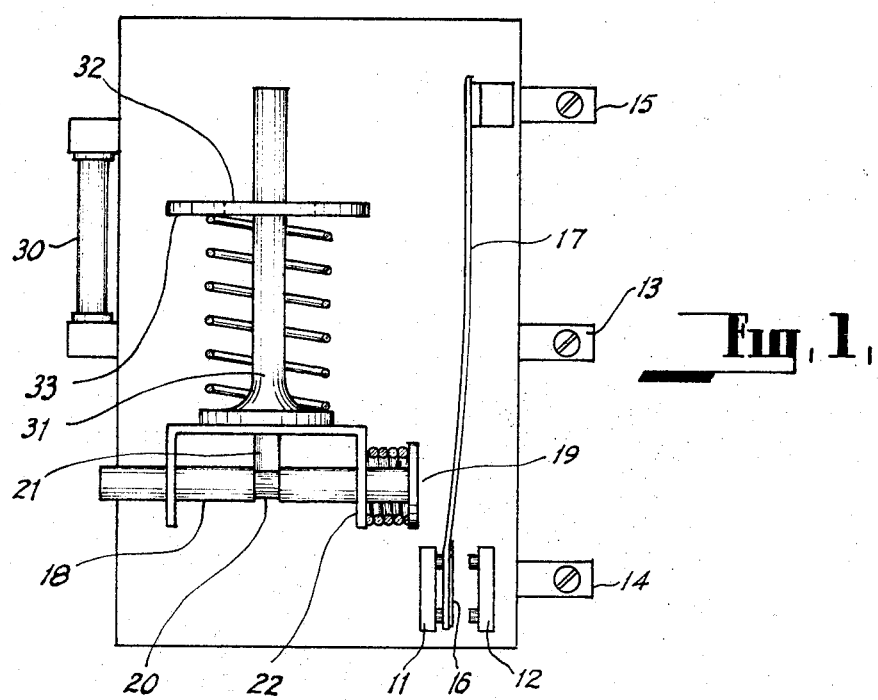
FIG. 1 is a plan view of the device showing the components thereof.

In the embodiment depicted in FIG. 1 the components are mounted within a suitable housing adapted to be fitted to the vehicle in a suitable location such as on the bulkhead. The components comprise a pair of spaced fixed contacts 11 and 12 each of which is connected to terminals projecting from the housing, the terminal 13 connected to contact 11 being connected to the battery of the vehicle and the other terminal 14 connected to contact 12 being adapted to be connected to a ground. A moving contact 16 mounted on a spring blade 17 is positioned so that it can move between a position in contact with one of the fixed contacts to a position in contact with the other of the fixed contacts. The blade is connected to a terminal 15 projecting from the housing which terminal is adapted to be connected to the main electrical supply lead to the electrical circuit of the vehicle. The blade 17 is so arranged that the moving contact 16 is normally in a position in contact with the fixed contact 11 which is connected to the battery through terminal 13.

A spring loaded trigger 18 is positioned so that if released one end 19 bears against the blade 17 of the moving contact so that it moves the blade to a position where the moving contact 16 is in contact with the fixed contact 12 connected to a ground through terminal 14. The trigger 18 is provided with a groove 20 which is engaged by a spring loaded spigot 21. The spigot 21 passes through a hole in a bracket 22 which serves to support the trigger 18. In this embodiment the spigot is mounted on the head of a piston like member 31, said head abutting the bracket 22, the rod portion of said piston like member passing through an aperture 32 in a mounting bracket 33. The aperture 32 is much larger in diameter than the diameter of said rod portion thus enabling the piston head to rock on the bracket 22 so that in the event of a sudden shock the spigot 21 is able to disengage from the groove 20.

If the vehicle should be subjected to a sudden shock as is the case when it is involved in a collision the shock will cause the spigot to move thereby disengaging it from the groove in the trigger. The trigger is thus released so that it bears against the blade 17 and moves the moving contact 16 to disengage it from the fixed contact 11 connected to the battery and to bring it into engagement with the fixed contact 12 connected to a ground. The electrical circuit of the vehicle is thereby isolated from the battery and grounded thus substantially eliminating the possibility of a spark from the electrical circuit causing a fire. Even if the motor still turns, after the collision, at a speed sufficient to operate the generator, no danger can ensue because the current so generated will run direct to the ground. Also because the electrical circuit is grounded the ignition is also grounded thereby preventing further operation of the motor.

The design of the spigot 21 is such that irrespective of the direction from which the vehicle fitted with the device is hit in a collision the spigot will rock on the bracket 22 and release the trigger 18.

Figure 2:
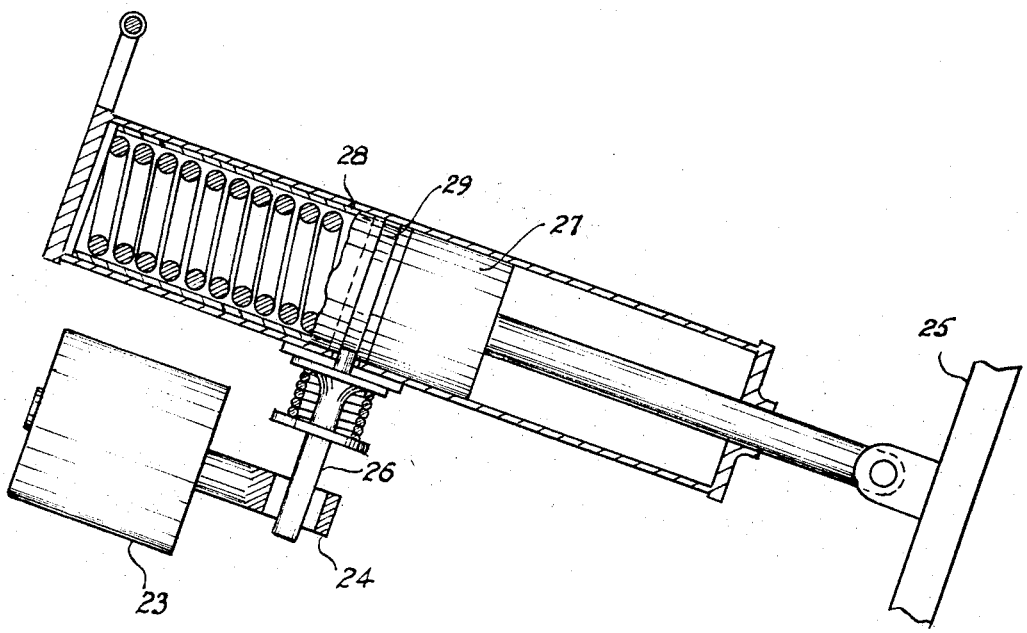
FIG. 2 is a sectional view of a mechanism incorporating a solenoid to operate the brake.

FIG. 2 illustrates how a solenoid may be incorporated in the device to apply the brakes in the event of a collision. In this case the coil of the solenoid 23 is connected to the terminal 13 connected to the battery, and to the terminal 15 connected to the blade 17 of the moving contact 16, while the plunger 24 of the solenoid is connected to one end of a spring loaded spigot 26, the other end of which engages a groove 29 in a spring loaded piston located in a cylinder. The spigot 26 is constructed substantially in the same manner as the spigot 31 of the embodiment shown in FIG. 1 of the drawings. The spring loaded piston is comprised of two parts 27 and 28, the part 27 being connected directly to the brake pedal 25 of the vehicle while the part 28 is provided with the groove 29.

Figure 3:
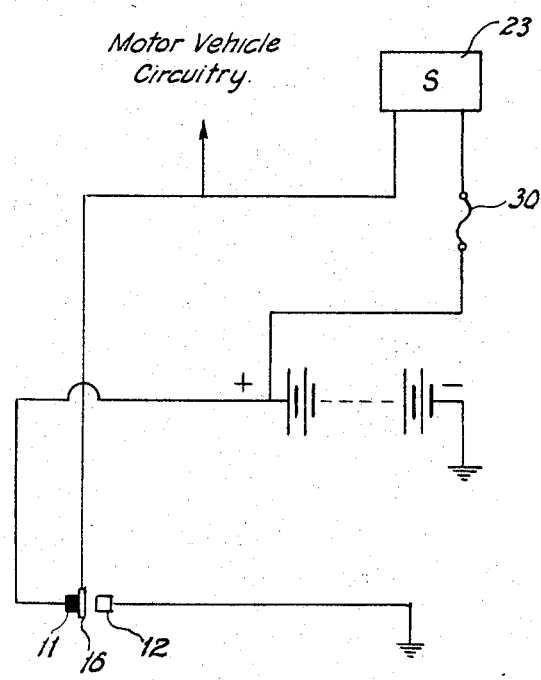
FIG. 3 is a circuit diagram of the device incorporating the solenoid.

The piston being divided into two parts 27 and 28 with the part 27 able to move independently of part 28, the brake pedal can be operated under normal conditions without upsetting the action of the solenoid operated spigot 26. In the event of a collision the trigger 18 (in FIG. 1) is released and bears against the blade 17 so that the moving contact 16 makes contact with fixed contact 12 connected to the ground. In this case as illustrated in FIG. 3 the circuit through the solenoid coil will be completed so that the plunger 24 moves the spigot 26 thereby disengaging it from the groove 29. This releases the piston 28 which is spring loaded and the brake pedal is thereby actuated and thus the brakes applied. A fuse 30 is inserted in the solenoid circuit such that when the circuit through the solenoid is completed and the solenoid has actuated the spigot 26 the fuse 30 will "blow" thus interrupting the circuit, and consequently the one remaining live electrical circuit of the vehicle is once again isolated from the battery and connected only to the ground.

If desired the plunger 24 may be connected directly to the brake pedal 25 so that operation of the solenoid applies the brakes.

Figure 4:
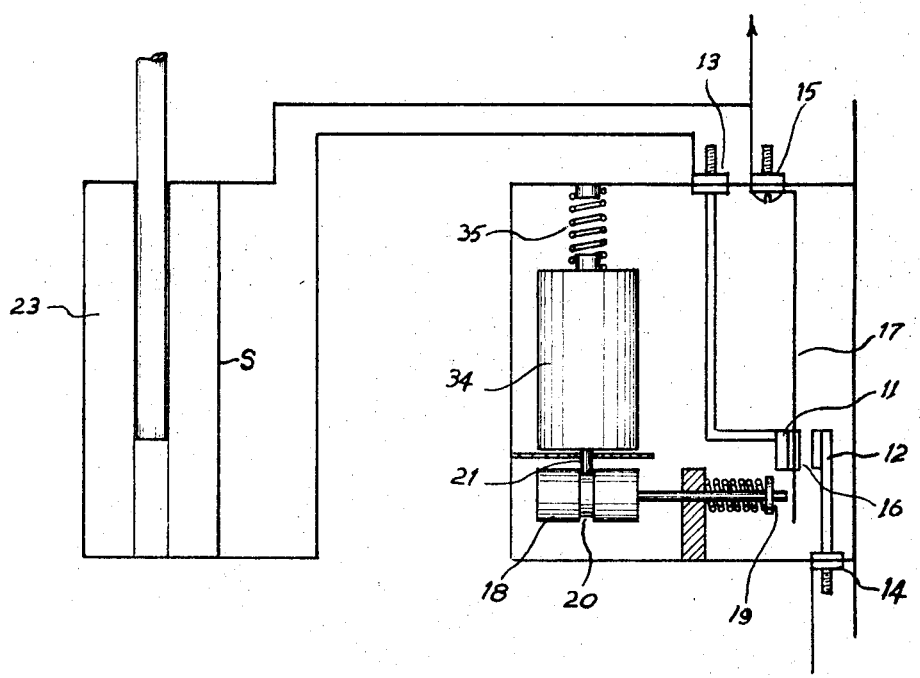
FIG. 4 is a plan view of a modified form of the device showing the components thereof.

In the form depicted in FIG. 4 the spigot 21 projects from one end of a heavy weight 34, the other end of the weight 34 being supported by a light coil spring 35.

I claim:

1. A device for isolating and grounding the electrical circuit of a motor vehicle in the event of a collision, comprising a pair of spaced fixed contacts one of which is adapted to be connected to one of the terminals of the battery of the motor vehicle and the other of which is adapted to be connected to a ground, a moveable contact adapted to be connected to the electrical circuit of the vehicle and biased to a position in contact with said one fixed contact; a spring-loaded trigger adapted to bear against the said moveable contact and move it to a position where it is in contact with said other fixed contact; and means for holding said trigger out of engagement with said moveable contact, said holding means being moveable when the vehicle is subjected to a sudden shock releasing said trigger against said moveable contact.

2. A device for isolating and grounding the electrical circuit of a motor vehicle in the event of a collision as claimed in claim 1 wherein said means for holding said trigger out of engagement with the moving contact includes a groove in said trigger, a spigot engaging said groove in said trigger in such a manner that when the vehicle is subjected to said shock the spigot disengages from said groove thus releasing said trigger.

3. A device for isolating and grounding the electrical circuit of a motor vehicle in the event of a collision as claimed in claim 2 wherein said spigot is spring-loaded, a bracket member slideably supporting said trigger, and having said spigot extending therethrough, a piston like member having a head abutting said bracket member and attached to said spigot, said head being capable in the event of said shock to a rocking action on said bracket member to disengage said spigot from said groove.

4. A device for isolating and grounding the electrical circuit of a motor vehicle in the event of a collision as claimed in claim 2 wherein a relatively heavy weight has said spigot projecting from an end thereof and a light coil spring supports the other end of said weight.

5. A device for isolating and grounding the electrical circuit of a motor vehicle in the event of a collision as claimed in claim 1 and including a solenoid adapted to operate the brake pedal of the vehicle, wherein the coil of the solenoid is connected to the terminal of the battery and to said moving contact, and means connects the plunger of the solenoid to said brake pedal.

6. A device for isolating and grounding the electrical circuit of a motor vehicle in the event of a collision as claimed in claim 1 and including a solenoid adapted to operate the brake pedal of the vehicle, wherein the coil of the solenoid is connected to the terminal of the battery and to said moving contact, and means connects the plunger of the solenoid to said brake pedal comprising an additional spring loaded spigot, a cylinder, a spring loaded piston located in said cylinder and having a groove, said piston being connected to said brake pedal and being adapted to actuate said brake pedal when said additional spigot disengages from said groove in said piston.

References Cited

UNITED STATES PATENTS

| | | | |
|---|---|---|---|
| 1,995,780 | 3/1935 | Phillips | 180—82 X |
| 2,020,160 | 11/1935 | Revett | 180—103 |
| 2,474,598 | 6/1949 | Smies | 180—104 |
| 2,979,582 | 4/1961 | Weaver | 200—61.45 |
| 3,011,040 | 11/1961 | Remer et al. | 180—104 |
| 3,198,899 | 8/1965 | Hitchcock | 180—104 X |
| 3,215,792 | 11/1965 | Lawyer | 200—61.5 |

KENNETH H. BETTS, *Primary Examiner.*